United States Patent [19]

Brolin

[11] 4,056,694
[45] Nov. 1, 1977

[54] TELEPHONE RINGING DETECTORS

[75] Inventor: Stephen Joseph Brolin, Livingston, N.J.

[73] Assignee: Bell Telephone Laboratories, Incorporated, Murray Hill, N.J.

[21] Appl. No.: 724,381

[22] Filed: Sept. 17, 1976

[51] Int. Cl.² .......................................... H04M 1/26
[52] U.S. Cl. ............................... 179/84 R; 179/17 E
[58] Field of Search ................. 179/17 E, 27 E, 84 R, 179/84 VF, 81 R, 86, 18 HB, 2.5 R

[56] References Cited

U.S. PATENT DOCUMENTS

| 3,597,551 | 8/1971 | Arneberg | 179/84 VF |
| 3,662,116 | 5/1972 | Wittman | 179/86 |
| 3,899,644 | 8/1975 | Hunt | 179/84 R |
| 3,916,111 | 10/1975 | Ott | 179/17 E |

OTHER PUBLICATIONS

H. W. Ott, "Ringing problems on long subscriber loops,"Telephony June 24, 1974, pp. 35-40.

*Primary Examiner*—Kathleen H. Claffy
*Assistant Examiner*—Joseph A. Popek
*Attorney, Agent, or Firm*—Robert O. Nimtz

[57] ABSTRACT

A telephone ringing signal detector is disclosed for detecting four-party fully selective superimposed ringing signals on a telephone line. Detecting these signals at the central office end of a subscriber loop carrier system permits encoding the ringing signals for transmission on the carrier system and subsequent decoding and utilization at a remote carrier terminal to control the regeneration of selective ringing signals.

The ringing detector includes separate 20 Hz alternating current signal detectors for each conductor of the telephone pair and further includes separate polarity detector for each conductor. The polarity signals for the two conductors are gated by the outputs of the respective 20 Hz signals and combined in a single polarity indication applicable for either conductor. False signaling indications are thereby prevented in the presence of central office variations of amplitude, waveform and level of the dc signals, as well as variations in the phase of the ringing signals.

10 Claims, 6 Drawing Figures

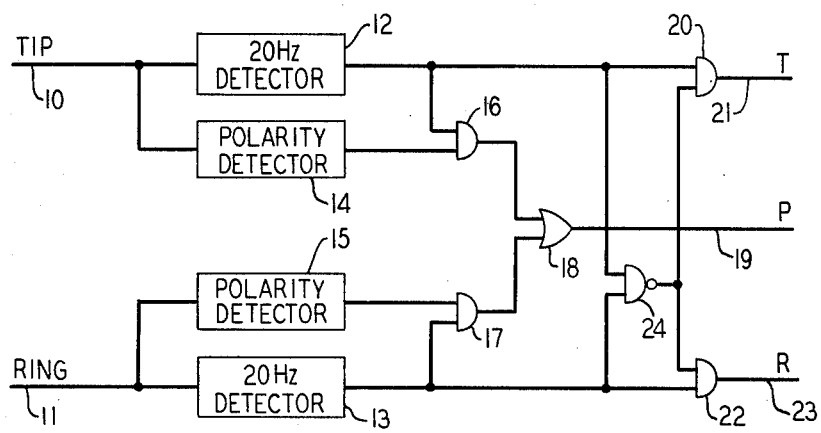
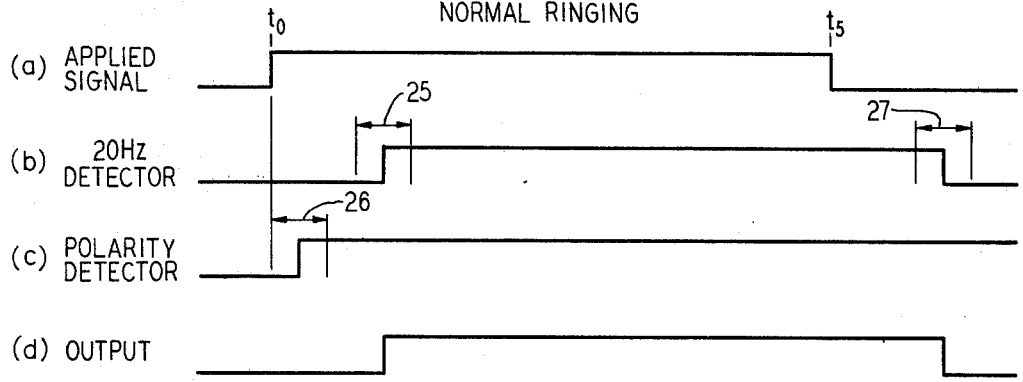
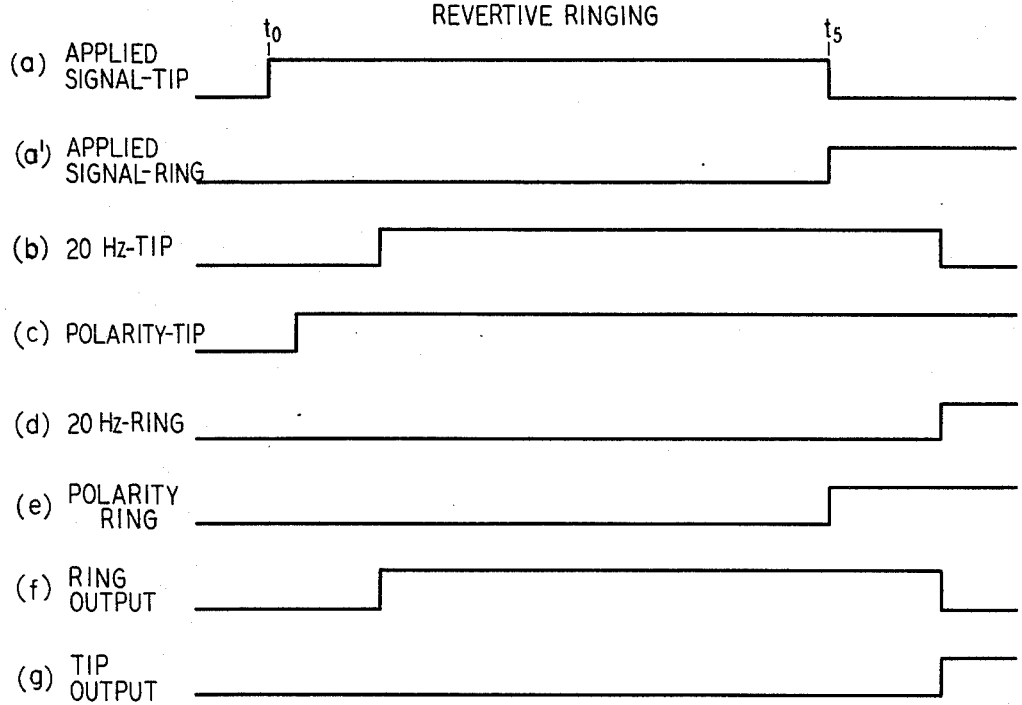

FULL WAVE 20Hz DETECTOR

GATED POLARITY DETECTOR

TELEPHONE RINGING DETECTORS

BACKGROUND OF THE INVENTION

1. Field of the Invention

This invention relates to complex alternating current and direct current signal detectors and, more particularly, to the detection of superimposed party line telephone ringing signals.

2. Description of the Prior Art

In subscriber loop carrier systems which service multiparty telephone lines, it is necessary to transmit the selective ringing signals through the carrier system. As shown in the copending application of R. J. Canniff-M. T. Manfred, Ser. No. 659,369, filed Feb. 19, 1976, it is therefore necessary to detect the multiparty superimposed ringing signals at the central office terminal of the carrier system. The detected ringing signals can then be encoded for transmission over the carrier system and used at the remote terminal of a carrier system. One such encoding scheme is disclosed in the aforementioned application of Canniff and Manfred.

Superimposed ringing signals comprise a nominal 20 Hz alternating current signal having a nominal peak voltage of approximately 120 volts. This signal is superimposed on a direct current battery voltage of a selected polarity. In order to distinguish between four different telephone subscribers connected to the same party line, the 20 Hz signal is applied selectively to either the tip or ring conductor and, furthermore, is superimposed on either a positive or a negative battery voltage.

Due to the large variation in actual waveforms and voltages of ringing signals and, moreover, due to the large variation in central office battery voltages, it is difficult to detect, both accurately and unambiguously, the ringing signals supplied by the central office. Timing errors in the detected signal could result in short ringing bursts (or bell taps) being applied to the ringer of the wrong subscriber, thus presenting a substantial interference with proper telephone service. This problem is greatly aggravated for revertive ringing situations where one party on a party line calls another party on the same party line. The normal procedure for such a case is to have the calling party hang up the telephone immediately after dialing the called party. The central office then alternately applies two selective ringing signals to the party line, first for the called party, and then for the calling party. When the called party picks up the telephone, ringing is tripped and the calling party, noting the termination of ringing, also picks up the telephone and a conversation can take place.

It will be noted that revertive ringing requires rapid switching of ringing signals between the tip and ring conductors and/or simultaneous rapid reversals of the polarity of the central office battery connections. It is particularly important in this situation to detect properly both ringing signals so as to ring only the calling and the called party's telephones. The wide latitude in voltages and waveforms of central office ringing signals makes possible wide variations in the timing of the detector outputs during revertive ringing. Correct and unambiguous detection of these ringing signals without timing overlaps is important to the proper operation of the party line carrier system.

SUMMARY OF THE INVENTION

In accordance with the illustrative embodiment of the present invention, a multiparty telephone ringing signal detector comprises a separate alternating current and polarity detectors for each conductor of the telephone pair. Outputs from the polarity detectors are inhibited in the absence of a corresponding output from the alternating current detectors, thus insuring that the proper polarity of the direct current voltage will be signaled only in the presence of proper amplitude of the alternating current voltage. In particular, the polarity detector has a faster attack time than the alternating current detector, but also has a slower decay or release time. A proper polarity indication is therefore always present when ac detection takes place.

In accordance with one feature of the invention, the simultaneous presence of alternating current signals on both conductors of the telephone pair prevents an indication of ringing for either conductor, or, alternatively, forces a ringing condition for a preferred one of the conductors.

In accordance with another feature of the present invention, the polarity detector includes a bidirectional voltage threshold circuit which blocks any normal central office direct current voltages on the conductor during nonringing intervals, and responds only to superimposed peaks. The threshold circuit also provides a very high impedance to test signals (e.g., insulation tests) on the telephone line which do not exceed the threshold.

Finally, ringing on one of the telephone conductors can be assigned a higher priority than ringing signals on the other conductor, thus affording a preference for the parties actually present in a partially utilized party line service, or permitting use of the detector on a single party line.

BRIEF DESCRIPTION OF THE DRAWING

FIG. 1 is a general block diagram of a telephone party line superimposed ringing signal detector in accordance with the present invention;

FIG. 2 is a timing diagram of the detected ringing signals for normal four-party ringing;

FIG. 3 is a timing diagram of the detected ringing signals for revertive ringing on a four-party telephone line;

DETAILED DESCRIPTION OF THE DRAWING

Figure 4:
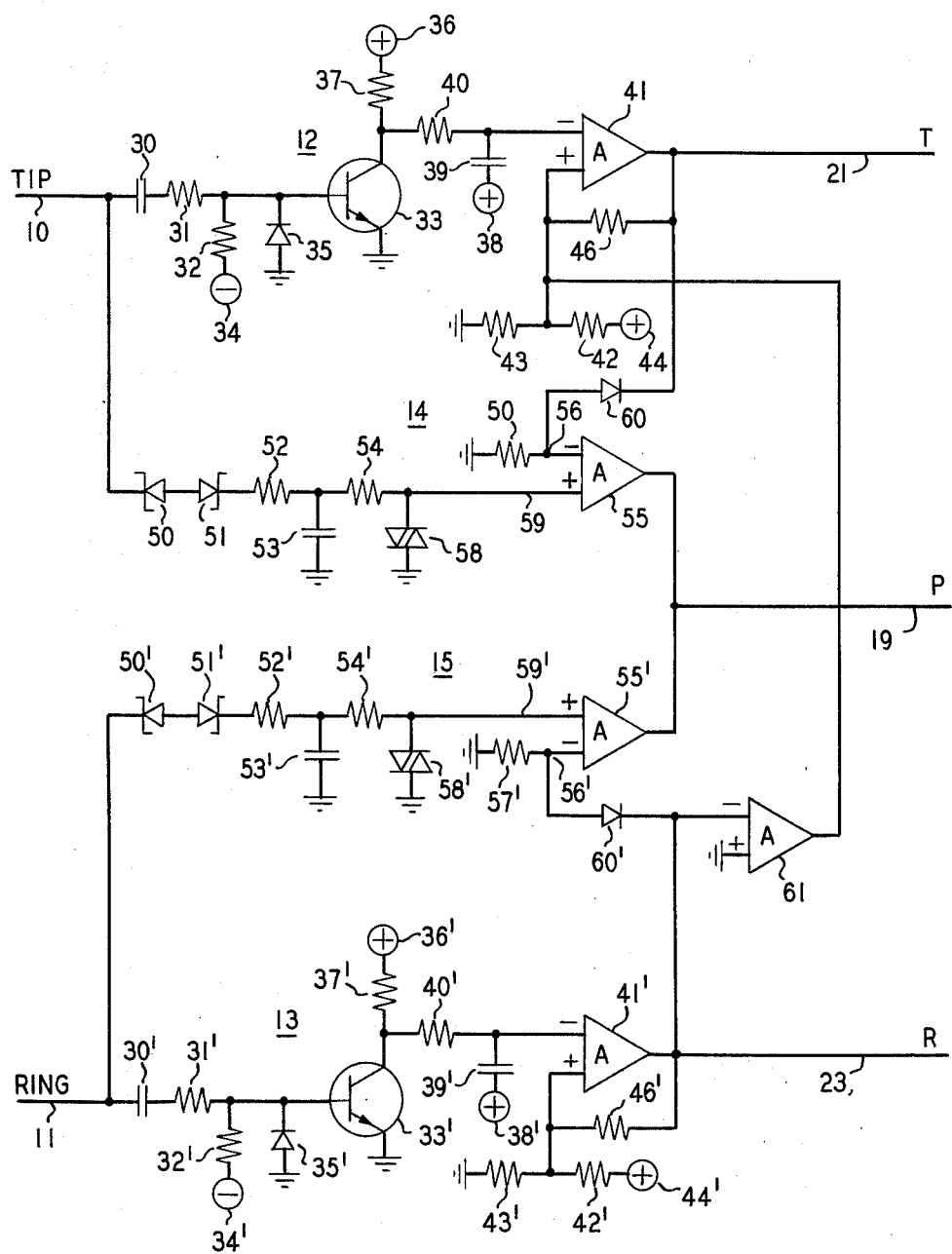
FIG. 4 is a detailed circuit diagram of the multiparty superimposed ringing signal detector of FIG. 1.

Refereing then to FIG. 1 there is shown a general block diagram of a four-party fully selective ringing signal detector for ringing signals appearing on tip conductor 10 and ring conductor 11 of a multiparty telephone line. A 20 Hz detector 12 is connected to tip conductor 10 while a similar 20 Hz detector 13 is connected to ring conductor 11. Similarly, a polarity detector 14 is connected to tip conductor 10 while a second and separate polarity detector 15 is connected to ring conductor 11.

The output of polarity detector 14 is inhibited by the output of 20 Hz detector 12 in AND gate 16. Similarly, the outputs of polarity detector 15 is inhibited by the output of 20 Hz detector 13 in AND gate 17. It can thus be seen that AND gates 16 and 17 will produce a positive polarity output only if an output is simultaneously present from the connected 20 Hz detector. The outputs of AND gates 16 and 17 are combined in OR gate 18 to provide a positive polarity indication on output lead 19 if either polarity detector and the associated 20 Hz detector are activated. It should be noted that some polarity indication is always present on output lead 19. If neither polarity detector is activated, the polarity is assumed negative.

The output of 20 Hz detector 12 is also applied to AND gate 20, the output of which is applied to lead 21 to indicate a 20 Hz signal on the tip conductor. Similarly, the output of 20 Hz detector 13 is applied to AND gate 22, the output of which appears on lead 23 and indicates the presence of a 20 Hz signal on ringing conductor 11.

In order to prevent the simultaneous indication of ringing on both T conductor 21 and R conductor 23, the outputs of 20 Hz detectors 12 and 13 are combined in inverting AND gate 24, the output of which provides an inhibiting input to AND gates 20 and 22. In this way, an output can be present on either of leads 21 or 23, but not on both of leads 21 and 23 at the same time.

The output signals on leads 19, 21, and 23 provide an unambiguous indication of the identity of the party being rung on a four-party fully selective ringing party line. As disclosed in the aforementioned application of Canniff and Manfred, these signals can be transmitted through a carrier system and detected at the remote carrier terminal to control the application of appropriate ringing signals to the party line. The various codes are shown in Table I.

TABLE 1

| Party | Superimposed Ringing Signal | T-P-R Signals |
|---|---|---|
| 1 | −R | 0 0 1 |
| 2 | −T | 1 0 0 |
| 3 | +R | 0 1 1 |
| 4 | +T | 1 1 0 |

The operation of the detection circuit of FIG. 1 can be more readily understood by referring to the timing diagrams in FIGS. 2 and 3. In FIG. 2 waveform (a) represents the timing of a typical ringing signal generated at a telephone central office. The ringing signal is applied at time $t_0$ and is removed at time $t_5$. In a typical application $t_5$ can be anywhere between 500 and 2000 milliseconds. As shown in waveform (b), the 20 Hz detector provides an output after a delay of approximately $t_1$, necessary to reliably detect the alternating current ringing signal. Due to variations in the voltage level and phase of the ringing signal, this detection interval can vary over an interval 25 of approximately 50 milliseconds.

As shown in waveform (c), the detection of the polarity of the direct current battery takes place much more rapidly but again can vary over an interval 26 of approximately 50 milliseconds. As shown in waveform (d), the outputs from the detection circuits of FIG. 1 do not appear until time $t_1$ when the 20 Hz detector is fully energized. This is due to the action of the AND gates 16 and 17 at the outputs of the polarity detectors 14 and 15, respectively. There is, of course, a corresponding range 27 of variability in detecting the termination of the 20 Hz signal. The polarity detector output at waveform (c), however, maintains its output indication well beyond the end of the ringing burst. As shown in waveform (d), however, the output signals T, P, and R track the 20 Hz detector outputs and thus afford an unambiguous indication of the proper four-party ringing signal. The polarity indication is binary-valued, and hence always indicates one or the other polarity.

In FIG. 3 there is shown the corresponding timing signals for the revertive ringing situation. Waveform (a) again indicates the applied signal and waveform (b) indicates the 20 Hz detector output from detector 13. Waveform (c) indicates the output from polarity detector 15 while waveforms (d) and (e) represent the corresponding 20 Hz and polarity outputs from detectors 12 and 14, respectively. It can be seen that the proper polarity indication is always available before ringing is signalled. Waveforms (f) and (g) represent the alternating outputs on leads 21 and 23 in the revertive ringing situation. AND gates 20 and 22 in FIG. 1 prevent overlapping of ringing on both conductors. The ringing signal detector of FIG. 1 thus provides an unambiguous identification of the party to be rung in the revertive ringing situation and also prevents unintended ringing burst or bell taps in the ringers of the other parties on the party line.

In FIG. 4 there is shown a detailed circuit diagram of the multiparty superimposed ringing signal detector shown in block form in FIG. 1. In particular, the 20 Hz detectors are shown at 12 and 13 while the polarity detectors are shown at 14 and 15. Twenty hertz detector 12 comprises a blocking capacitor 30 which blocks direct current signals from the detection circuits. Capacitor 30 is connected to a voltage divider including resistors 31 and 32, the center tap of which is connected to the base of transistor 33. The other end of resistor 32 is connected to negative biasing source 34 to provide a threshold voltage for turning transistor 33 ON. That is, transistor 33 remains in the OFF condition until the voltage level of the alternating current input signal exceeds the bias voltage supplied by source 34 and the voltage divider including resistors 31 and 32. Diode 35 provides a return path for negative excursions of the input alternating current signal and thus protects transistor 33.

The emitter of transistor 33 is connected to ground potential. The collector of transistor 33 is biased from positive voltage source 36 through biasing resistor 37. When transistor 33 is turned ON by a sufficiently large positive excursion in the input signal, current is drawn from positive voltage source 38 to charge capacitor 39 through resistor 40. The voltage across capacitor 39 starts to build up, lowering the voltage at the negative input to comparator 41. As successive positive excursions of the input signal turn transistor 33 ON, the voltage across capacitor 39 continues to build up until it is sufficiently large to trigger open-collector comparator circuit 41. The remaining input to comparator circuit 41 is supplied from the midpoint of a voltage divider including resistors 42 and 43 and connected between positive voltage source 44 and ground potential.

Comparator 41 is of a type which provides a binary output signal which remains in the low state until the voltage at the negative input to comparator 41 goes below the reference voltage at the midpoint of resistors 42 and 43. Once this threshold is crossed, comparator 41 quickly changes state, providing a high output signal on output lead 21. This high signal is connected back through resistor 46 to the midpoint of resistors 42 and 43 to supply the output stage of comparator 41.

Alternating current detector 12 is responsive only to positive excursions of the input signal above a preselected threshold. A number of such excursions are required before the output signal changes to the high state, thus minimizing erroneous responses to transient voltages on the tip conductor 10. Comparator 41 returns to the low state when capacitor 39 is allowed to discharge to voltage source 36 in the absence of input signals.

Alternating current detector 13 is identical to detector 12 and hence the corresponding circuit elements have been identified with the same reference numerals, primed. The resulting output signal from detector 13 appears on output lead 23 and indicates the presence of a ringing signal on the ring conductor 11.

The polarity detector 14 comprises a pair of zener diodes 50 and 51 connected with opposite polarities to provide a bidirectional peak voltage threshold for superimposed ringing signals appearing on tip conductor 10. That is, zener diodes 50 and 51 present a high impedance to superimposed signals until one of their breakdown voltages is reached. At that time these diodes present a very low impedance and permit detection of the direct current voltage component. Two such diodes are used to permit detection of a voltage of either polarity. Positive peaks superimposed on a positive dc voltage permit much longer and stronger conduction periods than negative peaks. Conversely, negative peaks superimposed on a negative dc voltage permit much longer and stronger conduction periods than positive peaks. The polarity detector responds to this difference in peak conduction periods.

Diodes 50 and 51 are selected to have breakdown voltages sufficiently high that breakdown does not occur for normal voltage levels on conductor 10. While the normal voltage on tip and ring conductors is on the order of 50 volts, it is customary at times to apply a test voltage or a silent interval voltage which may have a magnitude of up to 75 volts. Thus the breakdown voltages of diodes 50 and 51 are selected to be above this value, for example, 90 volts. In this way, the polarity detector not only presents a negligible leakage for test voltages on the line, but also maintains its slow decay time in the presence of large silent interval voltages.

When the combined voltage on conductor 10 exceeds the breakdown voltage of diode 50 or 51, current flows through resistor 52 to charge or discharge capacitor 53. The voltage on capacitor 53 is applied through resistor 54 to the positive input 59 of comparator 55, which may be identical to comparator 41. The other input to comparator 55 on lead 56 is connected through resistor 57 to ground potential. A varistor 58 is connected between the positive input 59 of comparator 55 and ground potential to insure that the voltage levels supplied to comparator 55 will remain within appropriate design ranges. Thus varistor 58 provides a lower impedance at higher voltage levels and thereby diverts excess current which might otherwise damage the components in comparator 55, or cause false operation.

Since the negative input to comparator 55 is held at ground potential by resistor 57, a positive input signal exceeding the threshold provided by diode 50 quickly causes comparator 55 to shift to a high output condition. This output condition appears on output terminal 19, indicating a positive polarity of the battery potential applied to tip conductor 10.

A negative superimposed battery condition on tip lead 10 breaks down zener diode 51, causing capacitor 53 to charge in the reverse direction. If comparator 55 is enabled, negative voltages force comparator 55 to the low state. In a revertive ringing situation the superimposed battery on tip conductor 10 may reverse polarity after each ringing burst and each silent interval. Under this condition, the breakdown of zener diode 51 rapidly discharges capacitor 53 to change the slow decay characteristic of detector 14 to a fast attack for the opposite polarity ringing signal. The polarity signal on output lead 19 is therefore able to track revertive ringing signals.

A diode 60 is connected between output lead 21 and input 56 to comparator 55. Diode 60 serves the inhibiting function provided by AND gate 16 in FIG. 1 by pulling lead 56 to a lower (below ground) voltage condition whenever lead 21 is low. The resulting signal on lead 56 is sufficiently low to prevent conduction of the comparator 55 output by any negative input signals applied at lead 59.

Polarity detector 15 is identical to comparator 14 and hence the components of comparator 15 have been identified by the same reference numerals, again primed. The OR function provided by OR gate 18 in FIG. 1 is accommodated simply by connecting the outputs of comparators 55 and 55' together to form output conductor 19. This is possible because of the open collector configuration which provides a low on lead 19 if either of comparators 55 or 55' is activated.

The inhibit action of AND gates 20, 22, and 24 in FIG. 1 is functionally supplied by open collector comparator circuit 61. The positive input of comparator 61 is connected to ground potential while the negative input is connected to output lead 23. Thus, if a high output signal appears on lead 23, comparator 61 is switched to its active low output condition, thereby lowering the positive input to comparator 41 to a level sufficient to force a low output. The circuit arrangement, in effect, gives priority to ringing on the ring conductor 11 by permitting a signal on lead 23 in preference to a signal on lead 21. Since party line systems which are not fully occupied utilize the ring conductor for ringing signals in preference to the tip conductor, this arrangement insures giving priority to the ringing condition most likely to occur. Moreover, the circuit can also be used on single party lines which also ring on the ring conductor. At the same time, it prevents ambiguous indications of ringing signals on both conductors.

The open collector comparator circuits 41, 41', 55, 55', and 61 are standard integrated circuit comparators. One such circuit is the LM 139 Voltage Comparator of the National Semiconductor Corporation.

The superimposed ringing detector of FIG. 4 has numerous advantages over other forms of ringing detectors. In the first place, the separate detection of alternating current and polarity signals on the conductors 10 and 11, together with the inhibit gating, provides added insurance against false ringing indications. Moreover, the various signaling inhibitions between output conductors 19, 21, and 23 prevent overlapped or ambiguous signals with central office ringing sources of varying waveform and magnitudes. Even more importantly, this arrangement provides unambiguous detection of ringing signals during revertive ringing when the ringing conditions are altered following each ringing burst to provide ringing on both the calling and called parties' lines. Moreover, the time delay in the operation of 20 Hz detectors 12 and 13 prevent response to transient noise conditions. The high threshold of detectors 14 and 15 insures a high impedance to leakage testing voltages and isolates the polarity detectors from high silent interval voltages sometimes used in party line arrangements.

Figure 5:
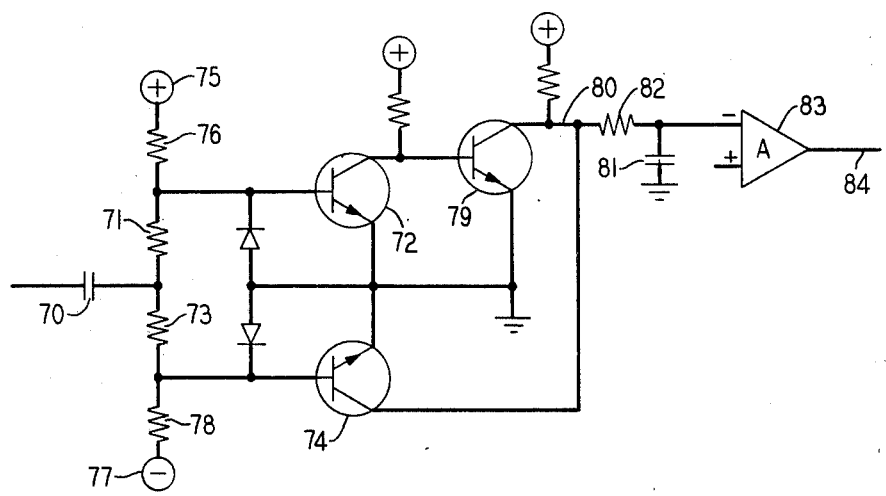
FIG. 5 is a detailed circuit diagram of a modification of the circuit of FIG. 4 showing a full wave 20 Hz detector.

In FIG. 5 there is shown a detailed circuit diagram of a modification of the detector circuit of FIG. 4 which provides full wave detection of the 20 Hz ringing signal. The detector of FIG. 5 may be substituted for detectors 12 and 13 in FIG. 4 and comprises input blocking capacitor 70 connected through resistor 71 to the base of transistor 72 and connected through resistor 73 to the base of transistor 74. Transistor 72 is biased from a positive voltage source 75 through resistor 76 while the base of transistor 74 is biased from negative voltage source 77 through resistor 78. Both transistors 72 and 74 are thus biased to turn ON during the positive excursions of the input signal. An inverting transistor 79 inverts the output of transistor 72 and the collectors of transistors 74 and 79 are connected together on lead 80. Lead 80 is therefore grounded for both the positive and negative excursions on the input signal, causing capacitor 81 to be discharged through resistor 82. When the voltage across capacitor 81 becomes sufficiently low, comparator 82 is triggered ON to provide an output signal on lead 84. The other input to comparator 83 can be connected as shown in FIG. 4 and thus these connections have not been shown in FIG. 5.

The advantage of the arrangement of FIG. 5 is that by using both the positive and negative excursion of the input signal, the 20 Hz signal can be more quickly detected with a greater assurance that the signal being detected is not a noise transient. Detection time is therefore less a function of ringing phase and takes place more quickly and uniformly.

Figure 6:
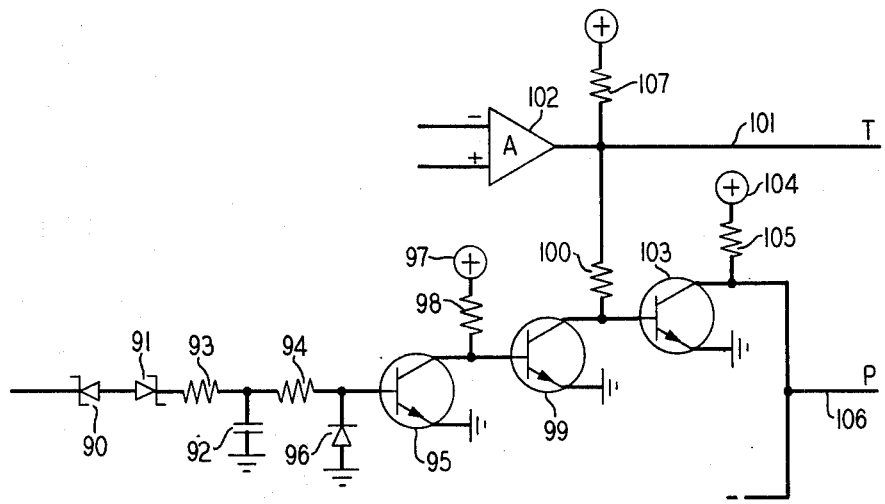
FIG. 6 is a detailed circuit diagram of a modification of the circuit of FIG. 4 showing an alternative polarity inhibiting circuit.

In FIG. 6 there is shown an alternative arrangement for the polarity detectors 14 and 15 in FIG. 4. As in FIG. 4, a pair of oppositely poled zener diodes 90 and 91 provide a basic voltage threshold for charging capacitor 92 through resistor 93. The voltage on capacitor 92 is delivered through resistor 94 to the base of transistor 95. A diode 96 prevents voltages of improper polarity from damaging transistor 95. The collector of transistor 95 is biased from positive voltage source 97 through resistor 98 and has its collector connected to the base of transistor 99. Transistor 99 is supplied through resistor 100 connected between its collector electrode and output lead 101 from comparator 102. Comparator 102, of course, corresponds to comparators 41 and 41' in FIG. 4, but with a "pullup" resistor 107 connected to its output. Thus transistor 99 cannot produce an output high until a high output signal appears on lead 101. Transistor 99 thereby serves the function of AND gate 16 or 17 in FIG. 1. The collector output of transistor 99 is connected to the base of isolating transistor 103, the collector of which is supplied from positive voltage source 104 through resistor 105. The collector of transistor 103 provides the polarity output indication on lead 106 corresponding to lead 19 in FIGS. 1 and 4.

The advantage of the gated polarity detector of FIG. 6 over that shown in FIG. 4 is the fewer number of components required to perform the detecting function. Transistors 95, 99, and 103 can be substituted for the comparator 55 or 55' and thereby realize the polarity detection function with significantly fewer components.

What is claimed is:

1. A detector for alternating current signals superimposed on a preselected polarity of direct current voltage comprising
   an alternating current detector;
   a direct current polarity detector; and
   means for enabling the operation of said direct current detector only in the presence of an output from said alternating current detector.

2. The detector according to claim 1 wherein said direct current detector includes a bilateral threshold circuit.

3. The detector according to claim 1 wherein said polarity detector has a fast attack time and a slow decay time.

4. A superimposed ringing signal detector for telephone conductor pairs comprising
   a separate ringing signal detector connected to each of said conductors;
   a separate direct current polarity detector connected to each of said conductors;
   means for enabling each said separate polarity detector by the separate ringing signal detector connected to the same conductor; and
   means for combining the outputs of said separate polarity detectors into a common polarity indicating output.

5. The superimposed ringing signal detector according to claim 4 further comprising
   means for enabling one, and only one, of said ringing signal detectors at a time.

6. The superimposed ringing signal detector according to claim 5 wherein said ringing signal detector enabling means includes means for providing priority to the ringing signal detector connected to a preselected one of said conductors.

7. The superimposed ringing signal detector according to claim 4 wherein said direct current polarity detectors each include at least one zener diode having a breakdown voltage exceeding the voltage on said conductor between ringing intervals.

8. The superimposed ringing signal detector according to claim 4 wherein said ringing signal detector includes a full-wave detector.

9. The superimposed ringing signal detector according to claim 4 wherein said polarity detector includes at least one semiconductor switch biased from the output of said ringing signal detector.

10. The superimposed ringing signal detector according to claim 4 wherein said polarity detector has a fast attack time and a slow decay time.

* * * * *